(12) United States Patent  (10) Patent No.: US 8,515,677 B1
Vail  (45) Date of Patent: Aug. 20, 2013

(54) METHODS AND APPARATUS TO PREVENT FAILURES OF FIBER-REINFORCED COMPOSITE MATERIALS UNDER COMPRESSIVE STRESSES CAUSED BY FLUIDS AND GASES INVADING MICROFRACTURES IN THE MATERIALS

(75) Inventor: William Banning Vail, Bothell, WA (US)

(73) Assignee: Smart Drilling and Completion, Inc., Bothell, WA (US)

( * ) Notice: Subject to any disclaimer, the term of this patent is extended or adjusted under 35 U.S.C. 154(b) by 315 days.

(21) Appl. No.: 12/804,039

(22) Filed: Jul. 12, 2010

Related U.S. Application Data

(63) Continuation-in-part of application No. 12/583,240, filed on Aug. 17, 2009, now Pat. No. 8,353,348, which is a continuation-in-part of application No. 12/005,105, filed on Dec. 22, 2007, now abandoned, which is a continuation-in-part of application No. 10/800,443, filed on Mar. 14, 2004, now Pat. No. 7,311,151, which is a continuation-in-part of application No. 10/729,509, filed on Dec. 4, 2003, now Pat. No. 7,032,658, which is a continuation-in-part of application No. 10/223,025, filed on Aug. 15, 2002, now Pat. No. 6,857,486.

(60) Provisional application No. 61/396,518, filed on May 29, 2010, provisional application No. 61/270,709, filed on Jul. 10, 2009.

(51) Int. Cl.
*G01N 15/08* (2006.01)
*G01L 1/00* (2006.01)

(52) U.S. Cl.
USPC ............. 702/12; 73/777; 264/108; 428/36.3; 702/42; 702/144

(58) Field of Classification Search
USPC ................ 702/9, 12, 34, 42, 43, 47, 53, 59, 702/144, 181; 73/777; 138/125; 264/108; 428/36.3; 166/61, 302, 367
See application file for complete search history.

(56) References Cited

U.S. PATENT DOCUMENTS 972,308 A  10/1910  Williamson
3,670,566 A  6/1972  Basham et al.

(Continued)

FOREIGN PATENT DOCUMENTS

EP  0553908  8/1993
EP  0571045  11/1993

(Continued)

OTHER PUBLICATIONS

Abyzbayev, B.I., et al., "Electrodrilling: Past Experience and Present Opportunities", SPE Paper 38624, 1997 SPE Annual Technical Conference and Exhibition, Oct. 5-8, 1997, pp. 573-588.

(Continued)

*Primary Examiner* — John H Le
(74) *Attorney, Agent, or Firm* — Sheridan Ross P.C.

(57) ABSTRACT

Methods and apparatus are described to use real-time measurement systems to detect the onset of compression induced microfracturing of fiber-reinforced composite materials. Measurements are described to detect the onset of compression induced microfracturing of fiber-reinforced composite materials to prevent catastrophic failures of aircraft components containing such materials. Methods and apparatus are described to prevent fluids and gases from invading any compression induced microfractures by coating surfaces of fiber-reinforced materials to reduce the probability of failure of such fiber-reinforced materials.

12 Claims, 4 Drawing Sheets

(56) References Cited

U.S. PATENT DOCUMENTS

| | | | |
|---|---|---|---|
| 3,837,412 A | 9/1974 | Driver |
| 3,878,312 A | 4/1975 | Bergh et al. |
| 3,975,617 A | 8/1976 | Othmer |
| 4,016,943 A | 4/1977 | Cullen et al. |
| 4,031,969 A | 6/1977 | Cullen et al. |
| 4,051,908 A | 10/1977 | Driver |
| 4,057,116 A | 11/1977 | Striegler |
| 4,075,862 A | 2/1978 | Ames |
| 4,085,808 A | 4/1978 | Kling |
| 4,095,865 A | 6/1978 | Denison et al. |
| 4,175,620 A | 11/1979 | Nolan et al. |
| 4,256,146 A | 3/1981 | Genini et al. |
| 4,336,415 A | 6/1982 | Walling |
| 4,367,980 A | 1/1983 | Ames et al. |
| 4,463,814 A | 8/1984 | Horstmeyer et al. |
| 4,538,682 A | 9/1985 | McManus et al. |
| 4,544,041 A | 10/1985 | Rinaldi |
| 4,557,538 A | 12/1985 | Chevalier |
| 4,676,310 A | 6/1987 | Scherbatskoy et al. |
| 4,793,409 A | 12/1988 | Bridges et al. |
| 4,806,115 A | 2/1989 | Chevalier et al. |
| 4,842,081 A | 6/1989 | Parant |
| 4,874,925 A | 10/1989 | Dickenson |
| 4,988,389 A | 1/1991 | Adamache et al. |
| 4,988,398 A | 1/1991 | Pereman et al. |
| 5,060,737 A | 10/1991 | Mohn |
| 5,070,533 A | 12/1991 | Bridges et al. |
| 5,099,918 A | 3/1992 | Bridges et al. |
| 5,129,452 A | 7/1992 | Wilson |
| 5,148,875 A | 9/1992 | Karlsson et al. |
| 5,172,765 A | 12/1992 | Sas-Jaworsky et al. |
| 5,176,180 A | 1/1993 | Williams et al. |
| 5,197,553 A | 3/1993 | Leturno |
| 5,235,259 A | 8/1993 | Dhindsa et al. |
| 5,271,472 A | 12/1993 | Leturno |
| 5,285,008 A | 2/1994 | Sas-Jaworsky et al. |
| 5,285,846 A | 2/1994 | Mohn |
| 5,289,561 A | 2/1994 | Costa Filho |
| 5,305,830 A | 4/1994 | Wittrisch |
| 5,332,048 A | 7/1994 | Underwood et al. |
| 5,353,872 A | 10/1994 | Wittrisch |
| 5,392,715 A | 2/1995 | Pelrine |
| 5,404,953 A | 4/1995 | Sangesland |
| 5,428,706 A | 6/1995 | Lequeux |
| 5,467,832 A | 11/1995 | Orban et al. |
| 5,472,057 A | 12/1995 | Winfree |
| 5,497,840 A | 3/1996 | Hudson |
| 5,551,521 A | 9/1996 | Vail, III |
| 5,553,678 A | 9/1996 | Barr et al. |
| 5,582,259 A | 12/1996 | Barr |
| 5,613,567 A | 3/1997 | Hudson |
| 5,667,011 A | 9/1997 | Gill et al. |
| 5,695,008 A | 12/1997 | Bertet et al. |
| 5,769,160 A | 6/1998 | Owens |
| 5,782,301 A | 7/1998 | Neuroth et al. |
| 5,828,003 A | 10/1998 | Thomeer et al. |
| 5,842,149 A | 11/1998 | Harrell et al. |
| 5,845,722 A | 12/1998 | Makohl et al. |
| 5,890,537 A | 4/1999 | Lavaure et al. |
| 5,894,897 A | 4/1999 | Vail, III |
| 5,908,049 A | 6/1999 | Williams et al. |
| 5,913,337 A | 6/1999 | Williams et al. |
| 5,921,285 A | 7/1999 | Quigley et al. |
| 6,004,639 A * | 12/1999 | Quigley et al. ............... 428/36.3 |
| 6,009,825 A | 1/2000 | Fulton et al. |
| RE36,556 E | 2/2000 | Smith et al. |
| 6,031,371 A | 2/2000 | Smart |
| 6,041,860 A | 3/2000 | Nazzal et al. |
| 6,049,657 A | 4/2000 | Sumner |
| 6,092,610 A | 7/2000 | Kosmala et al. |
| 6,112,808 A | 9/2000 | Isted |
| 6,112,809 A | 9/2000 | Angle |
| 6,148,664 A | 11/2000 | Baird |
| 6,148,866 A | 11/2000 | Quigley et al. |
| 6,158,531 A | 12/2000 | Vail, III |
| 6,189,621 B1 | 2/2001 | Vail, III |
| 6,196,336 B1 | 3/2001 | Fincher et al. |
| 6,216,533 B1 | 4/2001 | Woloson et al. |
| 6,257,162 B1 | 7/2001 | Watt et al. |
| 6,257,332 B1 | 7/2001 | Vidrine et al. |
| 6,263,987 B1 | 7/2001 | Vail, III |
| 6,264,401 B1 | 7/2001 | Langner et al. |
| 6,273,189 B1 | 8/2001 | Gissler |
| 6,278,095 B1 | 8/2001 | Bass et al. |
| 6,286,558 B1 | 9/2001 | Quigley et al. |
| 6,296,066 B1 | 10/2001 | Terry et al. |
| 6,318,467 B1 | 11/2001 | Liu et al. |
| 6,325,148 B1 | 12/2001 | Trahan et al. |
| 6,343,649 B1 | 2/2002 | Beck et al. |
| 6,354,373 B1 | 3/2002 | Vercamer et al. |
| 6,357,485 B2 * | 3/2002 | Quigley et al. ............... 138/125 |
| 6,359,569 B2 | 3/2002 | Beck et al. |
| 6,361,299 B1 | 3/2002 | Quigley et al. |
| 6,371,203 B2 | 4/2002 | Frank et al. |
| 6,371,693 B1 | 4/2002 | Kopp et al. |
| 6,374,924 B1 | 4/2002 | Hanton et al. |
| 6,397,946 B1 | 6/2002 | Vail, III |
| 6,408,943 B1 | 6/2002 | Schultz et al. |
| 6,412,562 B1 | 7/2002 | Shaw |
| 6,419,014 B1 | 7/2002 | Meek et al. |
| 6,419,033 B1 | 7/2002 | Hahn et al. |
| 6,431,282 B1 | 8/2002 | Bosma et al. |
| 6,484,818 B2 | 11/2002 | Alft et al. |
| 6,485,228 B1 | 11/2002 | Komatsu |
| 6,497,280 B2 | 12/2002 | Beck et al. |
| 6,509,557 B1 | 1/2003 | Bass |
| 6,536,522 B2 | 3/2003 | Birckhead et al. |
| 6,538,576 B1 | 3/2003 | Schultz et al. |
| 6,543,538 B2 | 4/2003 | Tolman et al. |
| 6,554,064 B1 | 4/2003 | Restarick et al. |
| 6,578,636 B2 | 6/2003 | Mazorow et al. |
| 6,604,550 B2 | 8/2003 | Quigley et al. |
| 6,615,845 B2 | 9/2003 | Abraskin et al. |
| 6,615,848 B2 | 9/2003 | Coats |
| 6,663,453 B2 | 12/2003 | Quigley et al. |
| 6,686,745 B2 | 2/2004 | Bass |
| 6,695,052 B2 | 2/2004 | Branstetter et al. |
| 6,706,348 B2 | 3/2004 | Quigley et al. |
| 6,707,012 B2 | 3/2004 | Stone, Jr. |
| 6,714,018 B2 | 3/2004 | Bass |
| 6,739,803 B2 | 5/2004 | Bass et al. |
| 6,772,840 B2 | 8/2004 | Headworth |
| 6,814,146 B2 | 11/2004 | Bass et al. |
| 6,857,452 B2 | 2/2005 | Quigley et al. |
| 6,857,486 B2 | 2/2005 | Chitwood et al. |
| 6,858,117 B2 | 2/2005 | Berton et al. |
| 6,868,906 B1 | 3/2005 | Vail et al. |
| 6,902,199 B2 | 6/2005 | Colyer et al. |
| 7,032,658 B2 | 4/2006 | Chitwood et al. |
| 7,311,151 B2 | 12/2007 | Chitwood et al. |
| 7,325,606 B1 | 2/2008 | Vail et al. |
| 7,836,950 B2 | 11/2010 | Vail |
| 7,938,996 B2 * | 5/2011 | Baughman et al. ............ 264/108 |
| 8,100,020 B2 * | 1/2012 | Kinlen et al. ................ 73/777 |
| 8,353,348 B2 | 1/2013 | Chitwood et al. |
| 2002/0066556 A1 | 6/2002 | Goode et al. |
| 2002/0157829 A1 | 10/2002 | Davis et al. |
| 2002/0170711 A1 | 11/2002 | Nuth |
| 2002/0189806 A1 | 12/2002 | Davidson et al. |
| 2003/0010491 A1 | 1/2003 | Collette |
| 2003/0056991 A1 | 3/2003 | Hahn et al. |
| 2003/0070841 A1 | 4/2003 | Merecka et al. |
| 2005/0121094 A1 | 6/2005 | Quigley et al. |
| 2008/0149343 A1 | 6/2008 | Chitwood |

FOREIGN PATENT DOCUMENTS

| | | |
|---|---|---|
| EP | 1106777 | 6/2001 |
| GB | 2357101 | 6/2001 |
| WO | WO 97/08418 | 3/1997 |
| WO | WO 00/28188 | 5/2000 |
| WO | WO 00/50730 | 8/2000 |
| WO | WO 01/12946 | 2/2001 |
| WO | WO 01/48352 | 7/2001 |
| WO | WO 01/94738 | 12/2001 |

| WO | WO 02/29441 | 4/2002 |
| WO | WO 02/086287 | 10/2002 |
| WO | WO 03/016671 | 2/2003 |
| WO | WO 03/036012 | 5/2003 |
| WO | WO 2004/053935 | 6/2004 |
| WO | WO 2004/083595 | 9/2004 |

OTHER PUBLICATIONS

Cales, Gerry, et al., "Subsidence Remediation—Extending Well Life Through the Use of Solid Expandable Casing Systems", AADE Paper 01-NC-HO-24, AADE Houston Chapter Mar. 2001 Conference, pp. 1-16.

Coats, E. Alan, et al., "The Hybrid Drilling Unit: An Overview of an Integrated Composite Coiled Tubing and Hydraulic Workover Drilling System", SPE Paper 74349, SPE International Petroleum Conference and Exhibition, Feb. 10-12, 2002, pp. 1-7.

Coats, E. Alan, et al., "The Hybrid Drilling System: Incorporating Composite Coiled Tubing and Hydraulic Workover Technologies into One Integrated Drilling System", IADC/SSPE 74538, IADC/SPE Drilling Conference, Feb. 26-28, 2002, pp. 1-7.

Daigle, Chan L., et al., "Expandable Tubulars: Field Examples of Application in Well Construction and Remediation", SPE Paper 62958, SPE Annual Technical Conference and Exhibition, Oct. 1-4, 2000, pp. 1-14.

Denison, E.B., "High Data-Rate Drilling Telemetry System", SPE Paper 6775, Journal of Petroleum Technology, Feb. 1979, pp. 155-163.

Downton, G.C., et al., "Rotary Steerable Drilling System for the 6-in Hole", SPE/IADC 79922, SPE/IADC Drilling Conference, Feb. 19-21, 2003, pp. 1-13.

Dupal, Kenneth K., et al., "Solid Expandable Tubular Technology—A Year of Case Histories in the Drilling Environment", SPE/IADC Paper 67770, SPE/IADC Drilling Conference, Feb. 27-Mar. 1, 2001, pp. 1-16.

Editor, "D2 Deepwater Driller Subsea, All Electric Coil Tubing Exploration System", printed from the website of www.XLTL.com, from the internet, on Aug. 13, 2003, 4 pages.

Filippov, Andrei, et al., "Expandable Tubular Solutions", SPE Paper 56500, 1999 SPE Annual Technical Conference and Exhibition, Oct. 3-6, 1999, pp. 1-6.

Head, P.F., et al., "Electric Coiled Tubing Drilling—The First Steps toward a Smart CT Drilling System", SPE Paper 46013, 1998 SPE-ICoTA Coiled Tubing Roundtable, Apr. 15-16, 1998, pp. 61-70.

Head, Phil, et al., "Intelligent Coiled Tubing Joint Industry Project", SPE Paper 60712, 2000 SPE/ICoTA Coiled Tubing Roundtable, Apr. 5-6, 2000, pp. 1-7.

Head, Philip, et al., "Electric Coiled Tubing Drilling (E-CTD) Project Update", SPE Paper 68441, SPE/ICoTA Coiled Tubing Roundtable, Mar. 7-8, 2001, pp. 1-9.

Head, Philip, et al., "Intelligent Coiled Tubing (ICT) for Completions and Flowlines", SPE Paper 68357, 2001 SPE/ICoTA Coiled Tubing Roundtable, Mar. 7-8, 2001, pp. 1-4.

Kamp, G.P., et al., "Development of a Power and Data Transmission Thermoplastic Composite Coiled Tubing for Electric Drilling", SPE Paper 60730, 2000 SPE/ICoTA Coiled Tubing Roundtable, Apr. 5-6, 2000, pp. 1-7.

Leising, L.J., et al., "Extending the Reach of Coiled Tubing Drilling (Thrusters, Equalizers and Tractors)", SPE/IADC Paper 37656, 1997 SPE/IADC Drilling Conference, Mar. 4-6, 1997, pp. 677-690.

Lohoefer, C. Lee, et al., "Expandable Liner Hanger Provides Cost-Effective Alternative Solution", IADC/SPE paper 59151, 2000 IADC/SPE Drilling Conference, Feb. 23-25, 2000, pp. 1-12.

Lurie, Paul, et al., "Smart Drilling with Electric Drillstring™", SPE/IADC Paper 79886, SPE/IADC Drilling Conference, Feb. 19-21, 2003, pp. 1-13.

Maranuk, C.A., et al., "A Concept of a New Steerable Drilling System for Coiled Tubing", SPE Paper 60752, 2000 SPE/ICoTA Coiled Tubing Roundtable, Apr. 5-6, 2000, pp. 1-10.

Marker, Roy, et al., "Anaconda: Joint Development Project Leads to Digitally Controlled Composite Coiled Tubing Drilling System", SPE Paper 60750, SPE/ICoTA Coiled Tubing Roundtable, Apr. 5-6, 2000, pp. 1-9.

Ohlinger, James J., et al., "A Comparison of Mud Pulse and E-Line Telemetry in Alaska CTD Operations", SPE Paper 74842, SPE/ICoTA Coiled Tubing Conference and Exhibition, Apr. 9-10, 2002, pp. 1-5.

Pavone, D.R., et al., "Application of High Sampling Rate Downhole Measurements for Analysis and Cure of Stick-Slip in Drilling", SPE Paper 28324, SPE 69th Annual Conference Technical and Exhibition, Sep. 25-28, 1994, pp. 335-345.

Rixse, Mel, et al., "High Performance Coil Tubing Drilling in Shallow North Slope Heavy Oil", IADC/SPE Paper 74553, IADC/SPE Drilling Conference, Feb. 26-28, 2002, pp. 1-10.

Sanchez, Alfredo, et al., "An Approach for the Selection and Design of Slim Downhole Motors for Coiled Tubing Drilling", SPE Paper 37054, 1996 SPE Horizontal Drilling Conference, Nov. 18-20, 1996, pp. 197-205.

Sarapuu, Erich, "Electrical Disintegrating Drilling", SPE Paper 300, 1962 Production Research Symposium, Apr. 12-13, 1962, pp. 201-206.

Sas-Jaworsky, Alexander, et al., "Development of Composite Coiled Tubing for Oilfield Services", SPE Paper 26536, 68th Annual Technical Conference and Exhibition, Oct. 3-6, 1993, pp. 1-15.

Sawaryn, S.J., "The Dynamics of Electric Submersible Pump Populations and the Implication for Dual ESP Systems", SPE Paper 63043, 2000 SPE Annual Technical Conference and Exhibition, Oct. 1-4, 2000, pp. 1-16.

Selby, Bruce, et al., "Hybrid Coiled Tubing System for Offshore Re-entry Drilling and Workover", IADC/SPE Paper 39374, 1998 IADC/SPE Drilling Conference, Mar. 3-6, 1998, pp. 711-721.

Shepard, S.F., et al., "Casing Drilling: An Emerging Technology", IADC/SPE Paper 67731, 2001 SPE/IADC Drilling Conference, Feb. 27-Mar. 1, 2001, pp. 1-13.

Tinkham, Scott K., et al., "Wired BHA Applications in Underbalanced Coiled Tubing Drilling", IADC/SPE Paper 59161, 2000 IADC/SPE Drilling Conference, Feb. 23-25, 2000, pp. 1-13.

Tumer, D.R., et al., "Electric Coiled Tubing Drilling: A Smarter CT Drilling System", SPE/IADC Paper 52791, 1999 SPE/IADC Drilling Conference, Mar. 9-11, 1999, pp. 1-13.

Turner, Daniel R., et al., "The All Electric BHA: Recent Developments towards an Intelligent Coiled-Tubing Drilling System", SPE Paper 54469, 1999 SPE/ICoTA Coiled Tubing Roundtable, May 25-26, 1999, pp. 1-10.

Turner, Dan, et al., "New D.C. Motor for Downhole Drilling and Pumping Applications", SPE Paper 68489, SPE/ICoTA Coiled Tubing Roundtable, Mar. 7-8, 2001, pp. 1-7.

Warren, Tommy M., et al., "Casing Drilling Application Design Considerations", IADC/SPE Paper 59179, 2000 IADC/SPE Drilling Conference, Feb. 23-25, 2000, pp. 1-11.

Official Action for U.S. Appl. No. 10/223,025, mailed Dec. 15, 2003.
Notice of Allowance for U.S. Appl. No. 10/223,025, mailed Aug. 6, 2004.
Official Action for U.S. Appl. No. 10/729,509, mailed Dec. 15, 2004.
Official Action for U.S. Appl. No. 10/729,509, mailed Jul. 14, 2005.
Notice of Allowance for U.S. Appl. No. 10/729,509, mailed Oct. 14, 2005.
Official Action for U.S. Appl. No. 10/800,443, mailed Jan. 17, 2006.
Official Action for U.S. Appl. No. 10/800,443, mailed Jun. 6, 2005.
Official Action for U.S. Appl. No. 10/800,443, mailed Sep. 8, 2006.
Official Action for U.S. Appl. No. 10/800,443, mailed Apr. 6, 2007.

Notice of Allowance for U.S. Appl. No. 10/800,443, mailed Aug. 27, 2007.
Official Action for U.S. Appl. No. 12/005,105, mailed Jan. 26, 2009.
Official Action for U.S. Appl. No. 12/005,105, mailed Nov. 20, 2009.
Official Action for U.S. Appl. No. 12/005,105, mailed Nov. 26, 2010.
Official Action for U.S. Appl. No. 12/583,240, mailed Dec. 5, 2011, 10 pages.
Notice of Allowance for U.S. Appl. No. 12/583,240, mailed Aug. 20, 2012, 7 pages.

Cohan "Is Boeing's 787 safe to fly?" Daily Finance, Jun. 24, 2009, 4 pages (found at http://vvww.dailyfinance.com/2009/06/24/is-boeing-s-787-safe-to-fly/)
Gates "Double trouble for Boeing 787 wing; Damage from design flaw extends into jet body; Problems surfaced at stress levels short of certification standard." The Seattle Times, Jul. 30, 2009, 1 page.
Gates "Months of delay likely for 787, Boeing partner says," The Seattle Times, Jun. 25, 2009, 3 pages.

* cited by examiner

METHODS AND APPARATUS TO PREVENT FAILURES OF FIBER-REINFORCED COMPOSITE MATERIALS UNDER COMPRESSIVE STRESSES CAUSED BY FLUIDS AND GASES INVADING MICROFRACTURES IN THE MATERIALS

PRIORITY FROM CURRENT U.S. PROVISIONAL PATENT APPLICATIONS

The present application relates to Provisional Patent Application No. 61/396,518, filed May 29, 2010, that is entitled "Letter to Boeing Management", an entire copy of which is incorporated herein by reference. That Provisional Patent Application presents an entire copy of applicant's letter dated Jul. 13, 2009 to management of the Boeing Company. That Jul. 13, 2009 letter states in part on the first page: "Technical Topic: Failures of Fiber-Reinforced Composite Materials Under Compressive Stresses Caused by Fluids and Gases Invading Microfractures"; and "Applicability to Boeing: Potential Catastrophic Failure of 787 Wings and Wing Junction Box Assemblies".

The present application also relates to Provisional Patent Application No. 61/270,709, filed Jul. 10, 2009, that is entitled "Methods and Apparatus to Prevent Failures of Fiber-Reinforced Composite Materials Under Compressive Stresses Caused by Fluids and Gases Invading Microfractures in the Materials".

Applicant claims priority to the above Provisional Patent Application No. 61/396,518, filed May 29, 2010, and to the above Provisional Patent Application No. 61/270,709, filed Jul. 10, 2009.

PRIORITY FROM U.S. PATENT APPLICATIONS

The present application is a continuation-in-part (C.I.P.) application of co-pending U.S. patent application Ser. No. 12/583,240, filed on Aug. 17, 2009, that is entitled "High Power Umbilicals for Subterranean Electric Drilling Machines and Remotely Operated Vehicles", an entire copy of which is incorporated herein by reference. Ser. No. 12/583,240 was published on Dec. 17, 2009 having Publication Number US 2009/0308656 A1, an entire copy of which is incorporated herein by reference.

Ser. No. 12/583,240 is a continuation-in-part (C.I.P.) application of co-pending U.S. patent application Ser. No. 12/005,105, filed on Dec. 22, 2007, that is entitled "High Power Umbilicals for Electric Flowline Immersion Heating of Produced Hydrocarbons", an entire copy of which is incorporated herein by reference. Ser. No. 12/005,105 was published on Jun. 26, 2008 having Publication Number US 2008/0149343, an entire copy of which is incorporated herein by reference.

Ser. No. 12/005,105 a continuation-in-part (C.I.P.) application of U.S. patent application Ser. No. 10/800,443, filed on Mar. 14, 2004, that is entitled "Substantially Neutrally Buoyant and Positively Buoyant Electrically Heated Flowlines for Production of Subsea Hydrocarbons", an entire copy of which is incorporated herein by reference. Ser. No. 10/800,443 was published on Dec. 9, 2004 having Publication Number US 2004/0244982 A1, an entire copy of which is incorporated herein by reference. Ser. No. 10/800,443 issued as U.S. Pat. No. 7,311,151 B2 on Dec. 22, 2007.

Ser. No. 10/800,443 is a continuation-in-part (C.I.P.) application of U.S. patent application Ser. No. 10/729,509, filed on Dec. 4, 2003, that is entitled "High Power Umbilicals for Electric Flowline Immersion Heating of Produced Hydrocarbons", an entire copy of which is incorporated herein by reference. Ser. No. 10/729,509 was published on Jul. 15, 2004 having the Publication Number US 2004/0134662 A1, an entire copy of which is incorporated herein by reference. Ser. No. 10/729,509 issued as U.S. Pat. No. 7,032,658 B2 on the date of Apr. 25, 2006, an entire copy of which is incorporated herein by reference.

Ser. No. 10/729,509 is a continuation-in-part (C.I.P) application of U.S. patent application Ser. No. 10/223,025, filed Aug. 15, 2002, that is entitled "High Power Umbilicals for Subterranean Electric Drilling Machines and Remotely Operated Vehicles", an entire copy of which is incorporated herein by reference. Ser. No. 10/223,025 was published on Feb. 20, 2003, having Publication Number US 2003/0034177 A1, an entire copy of which is incorporated herein by reference. Ser. No. 10/223,025 issued as U.S. Pat. No. 6,857,486 B2 on the date of Feb. 22, 2005, an entire copy of which is incorporated herein by reference.

Applicant claims priority from the above five U.S. patent application Ser. No. 12/583,240, Ser. No. 12/005,105, Ser. No. 10/800,443, Ser. No. 10/729,509 and Ser. No. 10/223,025.

CROSS-REFERENCES TO RELATED APPLICATIONS

This application relates to Provisional Patent Application No. 60/313,654 filed on Aug. 19, 2001, that is entitled "Smart Shuttle Systems", an entire copy of which is incorporated herein by reference.

This application also relates to Provisional Patent Application No. 60/353,457 filed on Jan. 31, 2002, that is entitled "Additional Smart Shuttle Systems", an entire copy of which is incorporated herein by reference.

This application further relates to Provisional Patent Application No. 60/367,638 filed on Mar. 26, 2002, that is entitled "Smart Shuttle Systems and Drilling Systems", an entire copy of which is incorporated herein by reference.

And yet further, this application also relates the Provisional Patent Application No. 60/384,964 filed on Jun. 3, 2002, that is entitled "Umbilicals for Well Conveyance Systems and Additional Smart Shuttles and Related Drilling Systems", an entire copy of which is incorporated herein by reference.

This application also relates to Provisional Patent Application No. 60/432,045, filed on Dec. 8, 2002, that is entitled "Pump Down Cement Float Valves for Casing Drilling, Pump Down Electrical Umbilicals, and Subterranean Electric Drilling Systems", an entire copy of which is incorporated herein by reference.

And yet further, this application also relates to Provisional Patent Application No. 60/448,191, filed on Feb. 18, 2003, that is entitled "Long Immersion Heater Systems", an entire copy of which is incorporated herein by reference.

Ser. No. 10/223,025 claimed priority from the above Provisional Patent Application No. 60/313,654, No. 60/353,457, No. 60/367,638 and No. 60/384,964, and applicant claims any relevant priority in the present application.

Ser. No. 10/729,509 claimed priority from various Provisional Patent Applications, including Provisional Patent Application No. 60/432,045, and 60/448,191, and applicant claims any relevant priority in the present application.

The present application also relates to Provisional Patent Application No. 60/455,657, filed on Mar. 18, 2003, that is entitled "Four SDCI Application Notes Concerning Subsea Umbilicals and Construction Systems", an entire copy of which is incorporated herein by reference.

The present application further relates to Provisional Patent Application No. 60/504,359, filed on Sep. 20, 2003, that is entitled "Additional Disclosure on Long Immersion Heater Systems", an entire copy of which is incorporated herein by reference.

The present application also relates to Provisional Patent Application No. 60/523,894, filed on Nov. 20, 2003, that is entitled "More Disclosure on Long Immersion Heater Systems", an entire copy of which is incorporated herein by reference.

The present application further relates to Provisional Patent Application No. 60/532,023, filed on Dec. 22, 2003, that is entitled "Neutrally Buoyant Flowlines for Subsea Oil and Gas Production", an entire copy of which is incorporated herein by reference.

And yet further, the present application relates to Provisional Patent Application No. 60/535,395, filed on Jan. 10, 2004, that is entitled "Additional Disclosure on Smart Shuttles and Subterranean Electric Drilling Machines", an entire copy of which is incorporated herein by reference.

Ser. No. 10/800,443 claimed priority from U.S. Provisional Patent Applications No. 60/455,657, No. 60/504,359, No. 60/523,894, No. 60/532,023, and No. 60/535,395, and applicant claims any relevant priority in the present application.

Further, the present application relates to Provisional Patent Application No. 60/661,972, filed on Mar. 14, 2005, that is entitled "Electrically Heated Pumping Systems Disposed in Cased Wells, in Risers, and in Flowlines for Immersion Heating of Produced Hydrocarbons", an entire copy of which is incorporated herein by reference.

Yet further, the present application relates to Provisional Patent Application No. 60/665,689, filed on Mar. 28, 2005, that is entitled "Automated Monitoring and Control of Electrically Heated Pumping Systems Disposed in Cased Wells, in Risers, and in Flowlines for Immersion Heating of Produced Hydrocarbons", an entire copy of which is incorporated herein by reference.

Further, the present application relates to Provisional Patent Application No. 60/669,940, filed on Apr. 9, 2005, that is entitled "Methods and Apparatus to Enhance Performance of Smart Shuttles and Well Locomotives", an entire copy of which is incorporated herein by reference.

And further, the present application relates to Provisional Patent Application No. 60/761,183, filed on Jan. 23, 2006, that is entitled "Methods and Apparatus to Pump Wirelines into Cased Wells Which Cause No Reverse Flow", an entire copy of which is incorporated herein by reference.

And yet further, the present application relates to Provisional Patent Application No. 60/794,647, filed on Apr. 24, 2006, that is entitled "Downhole DC to AC Converters to Power Downhole AC Electric Motors and Other Methods to Send Power Downhole", an entire copy of which is incorporated herein by reference.

RELATED U.S. APPLICATIONS

The following applications are related to this application, but applicant does not claim priority from the following related applications.

This application relates to Ser. No. 09/375,479, filed Aug. 16, 1999, having the title of "Smart Shuttles to Complete Oil and Gas Wells", that issued on Feb. 20, 2001, as U.S. Pat. No. 6,189,621 B1, an entire copy of which is incorporated herein by reference.

This application also relates to application Ser. No. 09/487,197, filed Jan. 19, 2000, having the title of "Closed-Loop System to Complete Oil and Gas Wells", that issued on Jun. 4, 2002 as U.S. Pat. No. 6,397,946 B1, an entire copy of which is incorporated herein by reference.

This application also relates to application Ser. No. 10/162,302, filed Jun. 4, 2002, having the title of "Closed-Loop Conveyance Systems for Well Servicing", that issued as U.S. Pat. No. 6,868,906 B1 on Mar. 22, 2005, an entire copy of which is incorporated herein by reference.

This application also relates to application Ser. No. 11/491,408, filed Jul. 22, 2006, having the title of "Methods and Apparatus to Convey Electrical Pumping Systems into Wellbores to Complete Oil and Gas Wells", that issued as U.S. Pat. No. 7,325,606 B1 on Feb. 5, 2008, an entire copy of which is incorporated herein by reference.

And this application also relates to application Ser. No. 12/012,822, filed Feb. 5, 2008, having the title of "Methods and Apparatus to Convey Electrical Pumping Systems into Wellbores to Complete Oil and Gas Wells", an entire copy of which is incorporated herein by reference.

RELATED FOREIGN APPLICATIONS

And yet further, this application also relates to PCT Application Serial Number PCT/US00/22095, filed Aug. 9, 2000, having the title of "Smart Shuttles to Complete Oil and Gas Wells", that has International Publication Number WO 01/12946 A1, that has International Publication Date of Feb. 22, 2001, that issued as European Patent No. 1,210,498 B1 on the date of Nov. 28, 2007, an entire copy of which is incorporated herein by reference.

This application further relates to PCT Patent Application Number PCT/US02/26066 filed on Aug. 16, 2002, entitled "High Power Umbilicals for Subterranean Electric Drilling Machines and Remotely Operated Vehicles", that has the International Publication Number WO 03/016671 A2, that has International Publication Date of Feb. 27, 2003, that issued as European Patent No. 1,436,482 B1 on the date of Apr. 18, 2007, an entire copy of which is incorporated herein by reference.

This application further relates to PCT Patent Application Number PCT/US03/38615 filed on Dec. 5, 2003, entitled "High Power Umbilicals for Electric Flowline Immersion Heating of Produced Hydrocarbons", that has the International Publication Number WO 2004/053935 A2, that has International Publication Date of Jun. 24, 2004, an entire copy of which is incorporated herein by reference.

This application further relates to PCT Patent Application Number PCT/US2004/008292, filed on Mar. 17, 2004, entitled "Substantially Neutrally Buoyant and Positively Buoyant Electrically Heated Flowlines for Production of Subsea Hydrocarbons", that has International Publication Number WO 2004/083595 A2 that has International Publication Date of Sep. 30, 2004, an entire copy of which is incorporated herein by reference.

RELATED U.S. DISCLOSURE DOCUMENTS

This application further relates to disclosure in U.S. Pat. No. 451,044, filed on Feb. 8, 1999, that is entitled 'RE:—Invention Disclosure—"Drill Bit Having Monitors and Controlled Actuators"', an entire copy of which is incorporated herein by reference.

This application further relates to disclosure in U.S. Pat. No. 458,978 filed on Jul. 13, 1999 that is entitled in part "RE:—INVENTION DISCLOSURE MAILED Jul. 13, 1999", an entire copy of which is incorporated herein by reference.

This application further relates to disclosure in U.S. Pat. No. 475,681 filed on Jun. 17, 2000 that is entitled in part "ROV Conveyed Smart Shuttle System Deployed by Workover Ship for Subsea Well Completion and Subsea Well Servicing", an entire copy of which is incorporated herein by reference.

This application further relates to disclosure in U.S. Pat. No. 496,050 filed on Jun. 25, 2001 that is entitled in part "SDCI Drilling and Completion Patents and Technology and SDCI Subsea Re-Entry Patents and Technology", an entire copy of which is incorporated herein by reference.

This application further relates to disclosure in U.S. Pat. No. 480,550 filed on Oct. 2, 2000 that is entitled in part "New Draft Figures for New Patent Applications", an entire copy of which is incorporated herein by reference.

This application further relates to disclosure in U.S. Pat. No. 493,141 filed on May 2, 2001 that is entitled in part "Casing Boring Machine with Rotating Casing to Prevent Sticking Using a Rotary Rig", an entire copy of which is incorporated herein by reference.

This application further relates to disclosure in U.S. Pat. No. 492,112 filed on Apr. 12, 2001 that is entitled in part "Smart Shuttle™ Conveyed Drilling Systems", an entire copy of which is incorporated herein by reference.

This application further relates to disclosure in U.S. Pat. No. 495,112 filed on Jun. 11, 2001 that is entitled in part "Liner/Drainhole Drilling Machine", an entire copy of which is incorporated herein by reference.

This application further relates to disclosure in U.S. Pat. No. 494,374 filed on May 26, 2001 that is entitled in part "Continuous Casting Boring Machine", an entire copy of which is incorporated herein by reference.

This application further relates to disclosure in U.S. Pat. No. 495,111 filed on Jun. 11, 2001 that is entitled in part "Synchronous Motor Injector System", an entire copy of which is incorporated herein by reference.

And yet further, this application also relates to disclosure in U.S. Pat. No. 497,719 filed on Jul. 27, 2001 that is entitled in part "Many Uses for The Smart Shuttle™ and Well Locomotive™", an entire copy of which is incorporated herein by reference.

This application further relates to disclosure in U.S. Pat. No. 498,720 filed on Aug. 17, 2001 that is entitled in part "Electric Motor Powered Rock Drill Bit Having Inner and Outer Counter-Rotating Cutters and Having Expandable/Retractable Outer Cutters to Drill Boreholes into Geological Formations", an entire copy of which is incorporated herein by reference.

Still further, this application also relates to disclosure in U.S. Pat. No. 499,136 filed on Aug. 26, 2001, that is entitled in part 'Commercial System Specification PCP-ESP Power Section for Cased Hole Internal Conveyance "Large Well Locomotive™"', an entire copy of which is incorporated herein by reference.

And yet further, this application also relates to disclosure in U.S. Pat. No. 516,982 filed on Aug. 20, 2002, that is entitled "Feedback Control of RPM and Voltage of Surface Supply", an entire copy of which is incorporated herein by reference.

And further, this application also relates to disclosure in U.S. Pat. No. 531,687 filed May 18, 2003, that is entitled "Specific Embodiments of Several SDCI Inventions", an entire copy of which is incorporated herein by reference.

Further, the present application relates to U.S. Pat. No. 572,723, filed on Mar. 14, 2005, that is entitled "Electrically Heated Pumping Systems Disposed in Cased Wells, in Risers, and in Flowlines for Immersion Heating of Produced Hydrocarbons", an entire copy of which is incorporated herein by reference.

Yet further, the present application relates to U.S. Pat. No. 573,813, filed on Mar. 28, 2005, that is entitled "Automated Monitoring and Control of Electrically Heated Pumping Systems Disposed in Cased Wells, in Risers, and in Flowlines for Immersion Heating of Produced Hydrocarbons", an entire copy of which is incorporated herein by reference.

Further, the present application relates to U.S. Pat. No. 574,647, filed on Apr. 9, 2005, that is entitled "Methods and Apparatus to Enhance Performance of Smart Shuttles and Well Locomotives", an entire copy of which is incorporated herein by reference.

Yet further, the present application relates to U.S. Pat. No. 593,724, filed Jan. 23, 2006, that is entitled "Methods and Apparatus to Pump Wirelines into Cased Wells Which Cause No Reverse Flow", an entire copy of which is incorporated herein by reference.

Further, the present application relates to U.S. Pat. No. 595,322, filed Feb. 14, 2006, that is entitled "Additional Methods and Apparatus to Pump Wirelines into Cased Wells Which Cause No Reverse Flow", an entire copy of which is incorporated herein by reference.

And further, the present application relates to U.S. Pat. No. 599,602, filed on Apr. 24, 2006, that is entitled "Downhole DC to AC Converters to Power Downhole AC Electric Motors and Other Methods to Send Power Downhole", an entire copy of which is incorporated herein by reference.

And finally, the present application relates to the U.S. Pat. that is entitled "Seals for Smart Shuttles" that was mailed to the USPTO on the Date of Dec. 22, 2006 by U.S. Mail, Express Mail Service having Express Mail Number EO 928 739 065 US, an entire copy of which is incorporated herein by reference.

Various references are referred to in the above defined U.S. Disclosure Documents. For the purposes herein, the term "reference cited in applicant's U.S. Disclosure Documents" shall mean those particular references that have been explicitly listed and/or defined in any of applicant's above listed U.S. Disclosure Documents and/or in the attachments filed with those U.S. Disclosure Documents. Applicant explicitly includes herein by reference entire copies of each and every "reference cited in applicant's U.S. Disclosure Documents". To best knowledge of applicant, all copies of U.S. Patents that were ordered from commercial sources that were specified in the U.S. Disclosure Documents are in the possession of applicant at the time of the filing of the application herein.

RELATED U.S. TRADEMARKS

Various references are referred to in the above defined U.S. Disclosure Documents. For the purposes herein, the term "reference cited in applicant's U.S. Disclosure Documents" shall mean those particular references that have been explicitly listed and/or defined in any of applicant's above listed U.S. Disclosure Documents and/or in the attachments filed with those U.S. Disclosure Documents. Applicant explicitly includes herein by reference entire copies of each and every "reference cited in applicant's U.S. Disclosure Documents". In particular, applicant includes herein by reference entire copies of each and every U.S. Patent cited in U.S. Pat. No. 452,648, including all its attachments, that was filed on Mar. 5, 1999. To best knowledge of applicant, all copies of U.S. Patents that were ordered from commercial sources that were specified in the U.S. Disclosure Documents are in the possession of applicant at the time of the filing of the application herein.

Applications for U.S. Trademarks have been filed in the USPTO for several terms used in this application. An application for the Trademark "Smart Shuttle'" was filed on Feb. 14, 2001 that is Ser. No. 76/213,676, an entire copy of which is incorporated herein by reference. The term Smart Shuttle® is now a Registered Trademark. The "Smart Shuttle" is also called the "Well Locomotive™". An application for the Trademark "Well Locomotive™" was filed on Feb. 20, 2001 that is Ser. No. 76/218,211, an entire copy of which is incorporated herein by reference. The term "Well Locomotive" is now a Registered Trademark. An application for the Trademark of "Downhole Rig" was filed on Jun. 11, 2001 that is Ser. No. 76/274,726, an entire copy of which is incorporated herein by reference. An application for the Trademark "Universal Completion Device" was filed on Jul. 24, 2001 that is Ser. No. 76/293,175, an entire copy of which is incorporated herein by reference. An application for the Trademark "Downhole BOP" was filed on Aug. 17, 2001 that is Ser. No. 76/305,201, an entire copy of which is incorporated herein by reference.

Accordingly, in view of the Trademark Applications, the term "smart shuttle" will be capitalized as "Smart Shuttle"; the term "well locomotive" will be capitalized as "Well Locomotive"; the term "downhole rig" will be capitalized as "Downhole Rig"; the term "universal completion device" will be capitalized as "Universal Completion Device"; and the term "downhole bop" will be capitalized as "Downhole BOP". In addition, the following Trademarks are also used herein: "Subterranean Electric Drilling Machine" abbreviated "SEDM™".

BACKGROUND OF THE INVENTION

1. Field of the Invention

The field of invention relates methods and apparatus to prevent failures of fiber-reinforced composite materials under compressive stresses caused by fluids and gases invading microfractures in those materials.

2. Description of the Related Art

Catastrophic failures of fiber-reinforced composite materials have proven to be a problem in the oil and gas industries. Now, such fiber-reinforced composite materials have now been incorporated into critically important structural components of aircraft. Such structural components include the wing and the wing junction boxes of aircraft. Any catastrophic failure of fiber-reinforced wings and/or wing junction boxes during flight would likely result in significant loss of life and the destruction of the aircraft.

The primary problem with composites is that they catastrophically delaminate under certain circumstances. For example please refer to the article entitled "Offshore oil composites: Designing in cost savings" by Dr. Jerry Williams, a copy of which appears in Attachment No. 3 to U.S. Provisional Patent Application No. 61/270,709, filed on Jul. 10, 2009, an entire copy of which is incorporated herein by reference. One notable quote is as follows: " . . . (the) failure modes are different for metals and composites: Compression failure modes for composites include delamination and shear crippling that involves microbuckling of the fibers."

From the quotes from Dr. Williams, clearly compressive forces applied to composites can cause significant problems. Carbon fiber filaments are typically woven into a fabric material, which may be typically impregnated with epoxy resin. Such structures are then typically laminated and cured. On a microscopic level, and in compression, the carbon fibers can buckle. This in turn opens up what the applicant herein calls "microfractures" (or "microcracks") in larger fabricated parts which are consequently subject to invasion by fluids and gasses.

Because of the risk of catastrophic delamination of composites under compression, our firm, Smart Drilling and Completion, Inc., decided some time ago to use titanium or aluminum interior strength elements, and to surround these materials with fiber-reinforced composite materials to make certain varieties of umbilicals. For example, please see FIGS. 1A, 1B, and 1C in the U.S. patent application entitled "High Power Umbilicals for Subterranean Electric Drilling Machines and Remotely Operated Vehicles", that is Ser. No. 12/583,240, filed Aug. 17, 2009, that was published on Dec. 17, 2009 as US 2009/038656 A1, an entire copy of which is incorporated herein by reference. Perhaps our firm will also include embedded syntactic foam materials so that the fabricated umbilicals are neutrally buoyant in typical drilling muds for its intended use in a borehole.

Please refer to the front-page article in The Seattle Times dated Jun. 25, 2009 entitled "787 delay: months, not weeks", an entire copy of which is incorporated herein by reference. This article states in part, under the title of "Last months: test" the following: "This test produced delamination of the composite material—separation of the carbon-fiber layers, in small areas where the MHI wings join the structure box embedded in the center fuselage made by Fugi Heavy Industries (FHI) of Japan." It should certainly be no news to anybody that this is a high stress area, and portions of these stresses will inevitably be compressive in nature.

Consequently, in such areas subject to compressive stresses, microfractures will allow water, water vapor, fuel, grease, fuel vapor, and vapors from burned jet fuel to enter these microfractures, that in turn, could cause a catastrophic failure of the wing and/or the wing junction box—possibly during flight.

The counter-argument can be presented as follows: "but, the military flies these materials all the time, and there is no problem". Yes, but, the military often keeps their planes in hangers, has many flight engineers inspecting them, and suitably recoats necessary surfaces with many chemicals to protect the composites and to patch radar absorbing stealth materials. So, it may not be wise to extrapolate the "no problems in the military argument" to the exposure of wings and wing boxes, including those of the 787, to at least some substantial repetitive compressive forces that may also be simultaneously subject to long-term environmental contamination by ambient fluids and gases.

Please also refer to the Jun. 24, 2009 summary article in the Daily Finance entitled "Is Boeing's 787 safe to fly"?, by Peter Cohan, the one page summary copy of which appears in Attachment No. 4 to U.S. Provisional Patent Application No. 61/270,709 filed on Jul. 10, 2009. This article states in part: "Composites are lighter and stronger hence able to fly more fuel efficiently. But engineers don't completely understand how aircraft made of composite materials will respond to the stresses of actual flight. This incomplete understanding is reflected in the computer models they use to design the aircraft. The reason for the fifth delay is that the actual 787 did not behave the way the model predicted."

The complete article entitled "Is Boeing's 787 safe to fly?", in the Daily Finance, by Peter Cohan, dated Jun. 24, 2009, further states: "Specifically, Boeing found that portions of the airframe—those where the top of the wings join the fuselage—experienced greater strain than computer models had predicted. Boeing could take months to fix the 787 design, run more ground tests and adjust computer models to better reflect reality." This article continues: "And this is what raises questions about the 787's safety. If engineers continue to be surprised by the 787's response to real-world operating stresses, there is some possibility that the testing process might not catch all the potential problems with the design and construction of the aircraft."

Significant problems have occurred in the past during the development of new airframes. For example, inadequate attention was paid the possibility of high stresses causing catastrophic metal fatigue during the development of the de Havilland Comet. High stresses were a surprise particularly around the square window corners. Such failure of adequate attention resulted in several notable crashes.

Another example is the explosive decompression in flight suffered by Aloha Airlines Flight 243. Water entering into an epoxy-aluminum bonded area caused the basic problem. Consequently, an epoxy resin failure between two laminated materials (in this case aluminum) has caused significant problems in the past.

SUMMARY OF THE INVENTION

An object of the invention is to provide methods and apparatus to use real-time measurement systems to detect the onset of compression induced microfracturing of fiber-reinforced composite materials.

Another object of the invention is to provide measurement means to detect the onset of compression induced microfracturing of fiber-reinforced composite materials to prevent catastrophic failures of aircraft components containing such materials.

And finally, another object of the invention is to provide methods and apparatus to prevent fluids and gases from invading any compression induced microfractures through any coated surfaces of fiber-reinforced materials to reduce the probability of failure of such fiber-reinforced materials.

DESCRIPTION OF THE PREFERRED EMBODIMENTS

The fiber-reinforced wings and wing boxes of Boeing 787's are described very well an article in The Seattle Times, dated Jul. 30, 2009, entitled "Double trouble for Boeing 787 wing" by Dominic Gates, that appears on the front page and on A8, an entire copy of which is incorporated herein by reference. That article provided several colored drawings showing the then existing wings and wing box assemblies, and the then proposed reinforcement of those assembles.

Some aspects of FIGS. 1, 2, 3 and 4 herein are based on the information provided in that Jul. 30, 2009 article in The Seattle Times. Applicant is grateful for that information.

Figure 1:
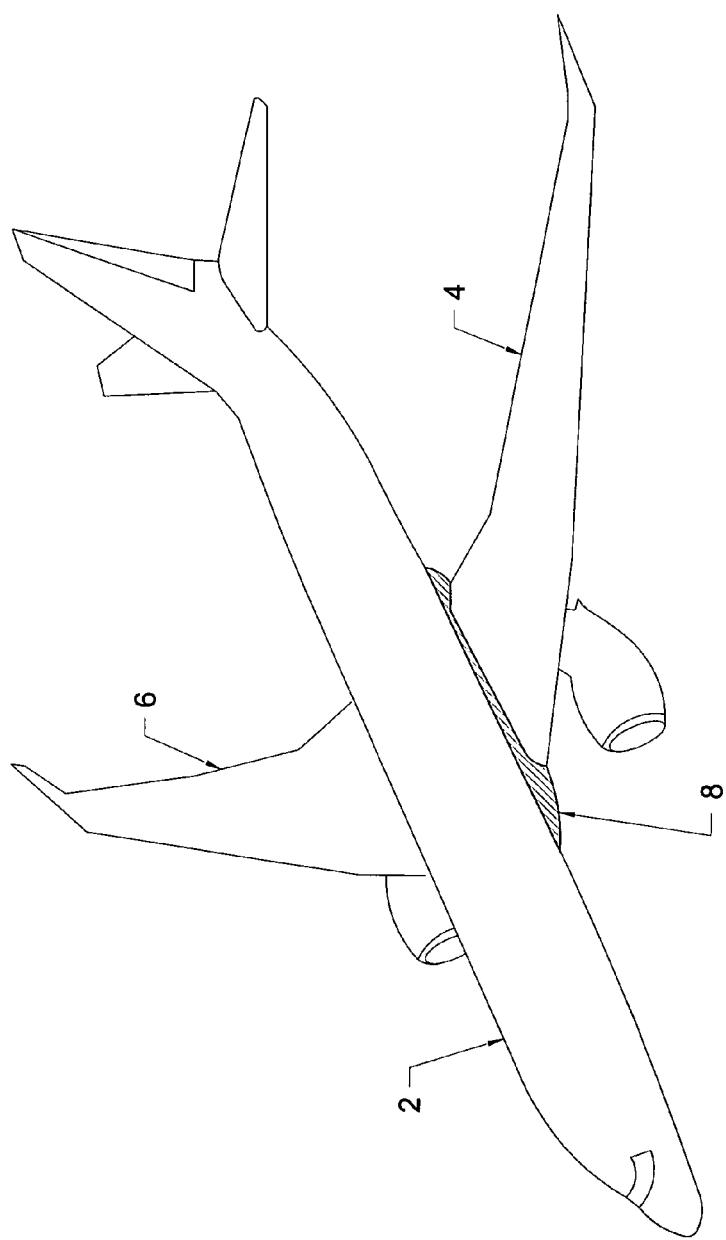
FIG. 1 shows an aircraft having substantial fiber-reinforced materials, such as a Boeing 787.

FIG. 1 shows an airplane 2 having substantial quantities of fiber-reinforced composite materials, that has a right wing 4 (when viewed standing in front of airplane 2), left wing 6, and center wing box 8. The wings and wing boxes are substantially fabricated from fiber-reinforced materials. In the Jul. 30, 2009 article, the airplane sketched was the Boeing 787.

Figure 2:
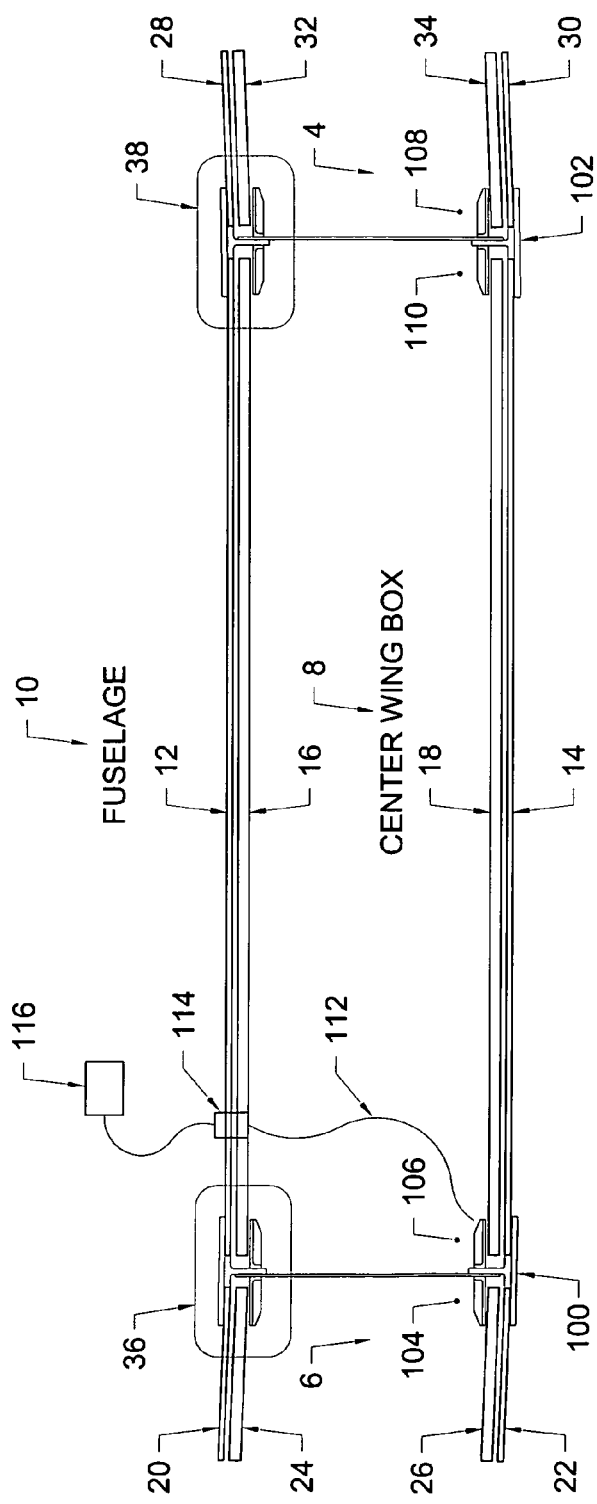
FIG. 2 shows how the right and left wings are attached to the center wing box, and the distribution of sensor array systems in a portion of the fiber-reinforced composite materials particularly subject to compressive stresses.

FIG. 2 shows a cross section view of the center wing box 8 in fuselage 10, having its top skin 12 and bottom skin 14, its top stringers 16, and its bottom stringers 18. Wing 6 has its top wing skin 20, bottom wing skin 22, its top stringers 24, and its bottom stringers 26. Wing 4 has its top wing skin 28, its bottom wing skin 30, its top stringers 32, and bottom stringers 34. Left wing connection apparatus 36 connects the left wing 6 to the mating portion of the center wing box. Upper right wing connection apparatus 38 connects the right wing 4 to the mating portion of the center wing box.

Figure 3:
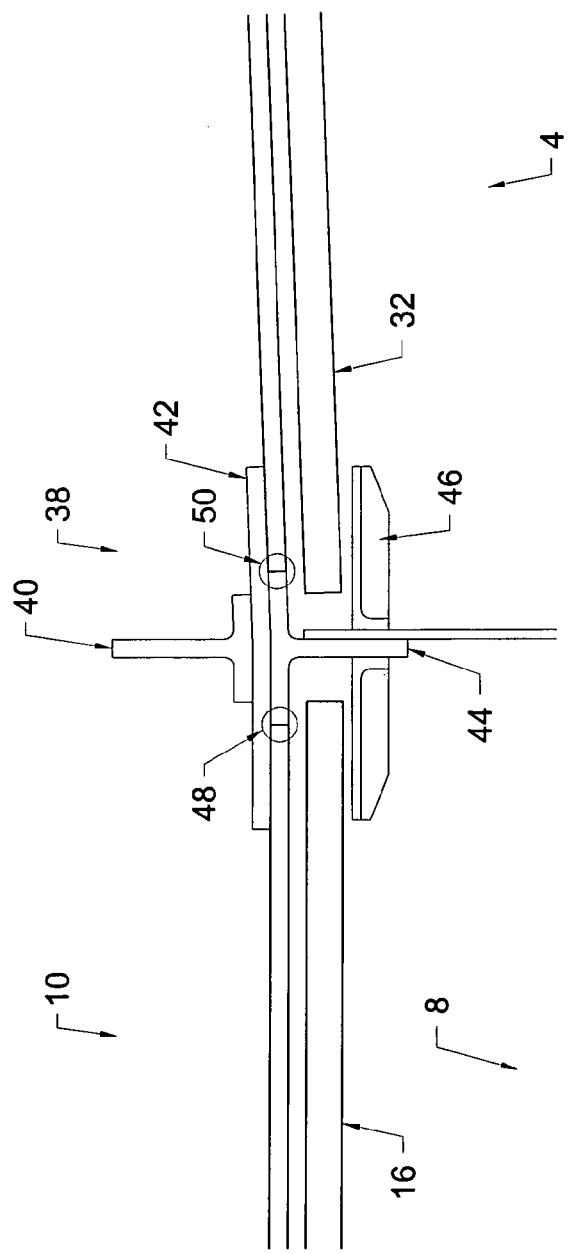
FIG. 3 shows the upper right wing connection apparatus which connects the upper right wing to the mating portion of the upper right center wing box.

FIG. 3 shows an expanded version of the upper right wing connection apparatus 38. Many of the various elements have already been identified above. In addition, the right-hand wall of the fuselage 40 is coupled to the center wing box 8 and to the right wing 4 by parts 42, 44, and 46. High stress points 48 and 50 were identified as being related to the failures of the wings and the center wing junction box during the tests described in the article dated Jul. 30, 2010.

Figure 4:
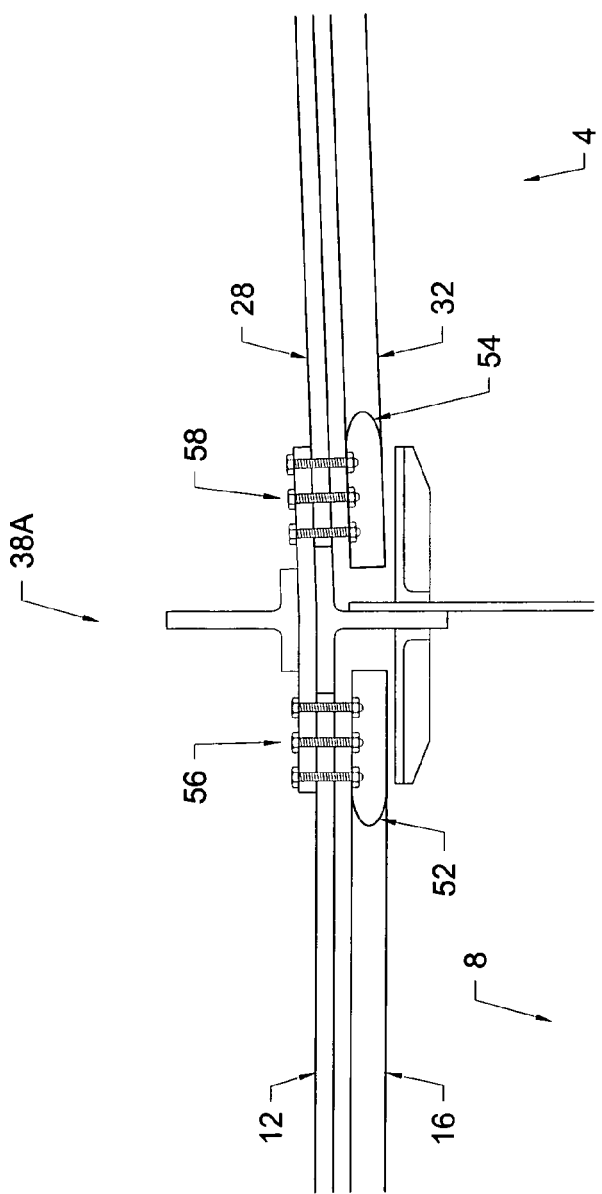
FIG. 4 shows modifications to the upper right wing connection apparatus which connects the upper right wing to the mating portion of the upper center wing box.

In FIG. 4, the modifications described in the article dated Jul. 30, 2010 are shown. U-shaped cutout in the stringers 52 and 54 are shown, along with the addition of fastener bolts 56 and 58. Element 38A shows an expanded version of the upper right wing connection apparatus that has been modified.

Referring again to FIG. 2, lower left-wing connection apparatus 100 and lower right-wing connection apparatus are areas which are in substantial compression. So, in these areas, the fiber reinforced materials are in substantial compression. Consequently, sensor array systems 104, 106, 108, and 110 are shown as being placed in areas subject to substantial compressive forces applied to the fiber-reinforced composite materials. These sensors array systems are monitored to determine if microfractures are being produced, and to determine if fluids and gases are invading any such microfactures in the materials.

Information from the sensor arrays are sent via wires such as 112 through wing box to fuselage connector 114 to monitoring instrumentation 116. That monitoring instrumentation may be in the fuselage, or external to the fuselage, or may be connected by a wireless communications link. Power to any measurement devices in the sensor array systems are provided by wires such as 112. By "sensor array" is meant to include means to make a change to the materials (such as the conduction of electricity) and the measurement of a parameter (such as a change in resistance or resistivity of the materials).

To avoid fluid invasion problems, in several preferred embodiments, real-time measurement systems are described to detect the onset of compression induced microfracturing. So, not only would stress and strain be measured in live-time, but also whether or not fluids and gases have invaded the microfractures. In other preferred embodiments, the electrical resistivity between adjacent laminated sections is used as a convenient way to determine if there has been invasion of conductive fluids (such as salt water) into the microfractures. Extraordinarily precise differential measurements may be made of such resistivity, and the applicant has had many years of experience in such measurements during the development of the Through Casing Resistivity Tool. In other preferred embodiments, precise differential measurements are made in real-time of various dielectric properties that will allow the detection of non-conductive fluids and gases. In other embodiments, undue swelling of the composites are also directly measured with sensors that will give an advance indication of potential catastrophic failures due to fluid and/or gas invasion. In many preferred embodiments, the sensors themselves are integrated directly into the composite materials during manufacture. In some preferred embodiments, the existing carbon fibers already present may be used. Accordingly, there are many live-time measurements that we can use to prevent catastrophic failures.

Yet other preferred embodiments of the invention provide inspection techniques based on measurements to determine invasion of fluids and gases into the composite materials is clearly needed.

A preferred embodiment of the invention describes a method to use real-time measurement systems to detect the onset of compression induced microfracturing of fiber-reinforced composite materials. In a preferred embodiment, the real-time measurement systems measure the electrical resistivity between different portions of the fiber-reinforced composite materials.

In selected embodiments, changes in time of electrical resistivity between different portions of the fiber-reinforced composite materials are used to determine the invasion of conductive fluids into the microfractures of the fiber-reinforced composite materials. In several preferred embodiments, fiber-reinforced composite materials comprise a portion of an umbilical in a subterranean wellbore that conducts electricity through insulated wires to a subterranean electric drilling machine. In other preferred embodiments, the fiber-reinforced composite materials comprise a portion of a Boeing 787 wing, 787 wing box assembly, and any combination thereof. The invention applies to fiber-reinforced composite materials used in any portion of an airplane.

In other preferred embodiments, the real-time measurement systems measure dielectric properties between different portions of fiber-reinforced composite materials. In selected embodiments, changes in time of measured dielectric properties between different portions of the fiber-reinforced composite materials are used to determine the invasion of fluids and gases into the microfractures of said fiber-reinforced composite materials. In selected preferred embodiments, these methods are used to monitor fiber-reinforced composite materials that comprise a portion of an umbilical in a subterranean wellbore. In other selected embodiments, the methods and apparatus are used to monitor fiber-reinforced composite materials comprise a portion of a Boeing 787 wing, 787 wing box assembly, and any combination thereof, or any other portion of fiber-reinforced composite materials comprising any portion of an airplane.

Selected preferred embodiments of the invention provide methods and apparatus wherein substantial portions of the real-time measurement systems are fabricated within the fiber-reinforced composite materials. In selected preferred embodiments, changes in time of measured properties are used to determine the invasion of fluids and gases into the microfractures of the fiber-reinforced composite materials.

In selected embodiments, measurement means are provided to detect the onset of compression induced microfracturing of fiber-reinforced composite materials to prevent catastrophic failures of aircraft components containing such materials. In other preferred embodiments, the measurement means further includes means to detect and measure the volume of fluids and gases that have invaded the microfractures in the fiber-reinforced composite materials.

In yet another preferred embodiment, methods and apparatus are provided to prevent fluids and gases from invading any compression induced microfractures of fiber-reinforced materials to reduce the probability of failure of such materials. Such methods and apparatus include special coating materials that coat fabricated fiber-reinforced materials, wherein such special materials are defined to be a coating material means. Such methods and apparatus further includes a coating material means is used to coat fiber-reinforced composite materials in visually inaccessible areas of airplanes. Such methods and apparatus further include special materials incorporated within the fiber-reinforced materials that are hydrophilic (tend to repel water). Such methods and apparatus further include special materials incorporated within the fiber-reinforced materials that absorb during a chemical reaction that produces a new portion of the matrix material in the fiber-reinforced composite material. Such methods and apparatus further includes special materials incorporated within the fiber-reinforced materials that absorb gases. Such methods and apparatus yet further includes self-healing substances designed to fill any such microfractures in the fiber-reinforced materials. Such methods and apparatus yet further include self-healing substances whereby at least one component of the matrix material used to make the fiber-reinforced composite material. Such matrix material may be comprised of at least an epoxy resin material and a hardener component. The self-healing substance may further include a hardener component designed to set-up slowly over a period in excess of one year.

Another preferred embodiment of the invention includes methods and apparatus wherein predetermined compressional stresses induce a chemical reaction within a special material fabricated within the fiber-reinforced composite material that prevents prevent fluids and gases from invading any compression induced microfractures of fiber-reinforced materials to reduce the probability of failure of such materials. In several preferred embodiments, such predetermined compressional stresses induce a structural phase transition within a special material fabricated within the fiber-reinforced composite material that prevents fluids and gases from invading any compression induced microfractures of fiber-reinforced materials to reduce the probability of failure of such materials.

Further embodiments include methods and apparatus wherein at least a portion of the fiber-reinforced composite material is exposed to a relatively high-pressure inert gas which slowly diffuses through other portions of the fiber-reinforced composite material to prevent other fluids and gases from invading any compression induced microfractures of the fiber-reinforced material to reduce the probability of failure of the material. The inner gas can include dry nitrogen. Such methods and apparatus apply to any portion of a fiber-reinforced material that is comprised of at least one channel within said fiber-reinforce composite material.

Yet other preferred embodiments provide additional special fibers that are added during the manufacturing process of a standard fiber-reinforced composite material to make a new special fiber-reinforced material to prevent fluids and gases from invading any compression induced microfractures of said special fiber-reinforced material to reduce the probability of failure of said special fiber-reinforced material. Such special fibers include fibers comprised of titanium. Such special fibers include fibers comprised of any alloy containing titanium.

Other embodiments provide special fibers that are added during the manufacturing process of a standard fiber-reinforced composite material to make a new special fiber-reinforced material to reduce the probability of the formation of stress-induced microfractures in said material. Such special fibers include fibers comprised of titanium. Such special fibers include fibers comprised of any alloy containing titanium.

Other preferred embodiments provide methods and apparatus to isolate the wing boxes of composite aircraft from environmental liquids, such as water, and from environmental gases, such as jet exhaust to reduce the probability of failure of such materials. Such methods and apparatus include means to prevent fluids and gases from invading any compression induced microfractures through any coated surfaces of fiber-reinforced materials to reduce the probability of failure of such fiber-reinforced materials.

Other selected embodiments of the invention incorporate the relevant different types of physical measurements defined in U.S. Provisional Patent Application 61/270,709, filed Jul. 9, 2010. For example, such physical measurements include acoustic transmitters and receivers, ultrasonic transmitters and receivers, thermosonics, acoustic resonance techniques, x-ray techniques, thermal wave imaging, phased array ultrasonics, shearography, radiography, air coupled ultrasonics, thermography.

While the above description contains many specificities, these should not be construed as limitations on the scope of the invention, but rather as exemplification of preferred embodiments thereto. As have been briefly described, there are many possible variations. Accordingly, the scope of the invention should be determined not only by the embodiments illustrated, but by any appended claims and their legal equivalents that will eventually issue in a relevant patent or patents.

What is claimed is:

1. A method to use real-time measurement systems to detect the onset of compression induced microfracturing of fiber-reinforced composite materials, comprising:
   a) measuring an electrical resistivity between different portions of the fiber-reinforced composite materials, and
   b) determining an invasion of conductive fluids in the microfractures of said fiber-reinforced composite materials by measuring changes in electrical resistivity over a time interval between different portions of the fiber-reinforced composite materials.

2. The method of claim 1 wherein said fiber-reinforced composite materials comprise a portion of an umbilical in a subterranean wellbore that conducts electricity through insulated wires to a subterranean electric drilling machine.

3. The method of claim 1 wherein said fiber-reinforced composite materials comprise at least one of a portion of a Boeing 787 wing, 787 wing box assembly, and any combination thereof.

4. The method of claim 1 wherein said fiber-reinforced composite materials comprise any portion of an airplane.

5. A method to detect the onset of compression induced micro-fracturing of fiber-reinforced composite materials, comprising:
   a) measuring dielectric properties between different portions of fiber-reinforced composite materials using a real time measurement system, and
   b) determining an invasion of conductive fluids in the micro-fractures of said fiber-reinforced composite materials by changes in measured dielectric properties over a time interval between different portions of the fiber-reinforced composite materials.

6. The method of claim 5 wherein said fiber-reinforced composite materials comprise a portion of an umbilical in a subterranean wellbore that conducts electricity through insulated wires to a subterranean electric drilling machine.

7. The method of claim 5 wherein said fiber-reinforced composite materials comprise at least one of a portion of a Boeing 787 wing, 787 wing box assembly, and any combination thereof.

8. The method of claim 5 wherein said fiber-reinforced composite materials comprise any portion of an airplane.

9. A method to detect the onset of compression induced micro-fracturing of fiber-reinforced composite materials, comprising:
   a) fabricating substantial portions of a real-time measurement system within the fiber-reinforced composite materials, and
   b) using the real-time measurement system to determine an invasion of fluids and gases in the micro-fractures of said fiber-reinforced composite materials by changes in measured resistivity or dielectric properties over a time interval between different portions of the fiber-reinforced composite materials.

10. The method of claim 9 wherein said fiber-reinforced composite materials comprise a portion of an umbilical in a subterranean wellbore that conducts electricity through insulated wires to a subterranean electric drilling machine.

11. The method of claim 9 wherein said fiber-reinforced composite materials comprise at least one of a portion of a Boeing 787 wing, 787 wing box assembly, and any combination thereof.

12. The method of claim 9 wherein said fiber-reinforced composite materials comprise any portion of an airplane.

* * * * *